United States Patent
Yang et al.

(10) Patent No.: US 10,498,531 B2
(45) Date of Patent: Dec. 3, 2019

(54) ELECTRONIC SUBSCRIBER IDENTITY MODULE (ESIM) PROVISIONING ERROR RECOVERY

(71) Applicant: Apple Inc., Cupertino, CA (US)

(72) Inventors: Xiangying Yang, Cupertino, CA (US); Li Li, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 193 days.

(21) Appl. No.: 15/602,027

(22) Filed: May 22, 2017

(65) Prior Publication Data

US 2017/0338954 A1   Nov. 23, 2017

Related U.S. Application Data

(60) Provisional application No. 62/340,367, filed on May 23, 2016, provisional application No. 62/354,554, filed on Jun. 24, 2016.

(51) Int. Cl.
*H04L 29/06* (2006.01)
*H04L 9/08* (2006.01)
(Continued)

(52) U.S. Cl.
CPC .......... *H04L 9/0863* (2013.01); *H04L 9/0838* (2013.01); *H04L 9/0894* (2013.01);
(Continued)

(58) Field of Classification Search
CPC ....... H04L 9/08; H04L 9/0863; H04L 9/0838; H04L 9/0894; H04L 9/3273;
(Continued)

(56) References Cited

U.S. PATENT DOCUMENTS 8,306,518 B1 *  11/2012  Gailloux ............. H04L 41/0813
                                                                         455/418
9,300,473 B2 *   3/2016  Nix ......................... H04W 4/70
(Continued)

OTHER PUBLICATIONS

GSM Association, Official Document SGP.21—RSP Architecture, Version 1.0, Dec. 23, 2015, 52 pages.
(Continued)

*Primary Examiner* — Hosuk Song
(74) *Attorney, Agent, or Firm* — Dickinson Wright RLLP

(57) ABSTRACT

A device hosting a universal integrated circuit card (UICC or eUICC) initiates a provisioning call flow with an electronic subscriber identity module (eSIM) server. The purpose of the provisioning call flow is to perform a particular provisioning action or function. The eSIM server, the device and/or the eUICC maintain state information related to the provisioning call flow. The provisioning call flow includes generation of a one-time public key (otPK) at the eUICC. The provisioning call flow is interrupted by an error event before, for example, successful installation of a profile in the eUICC. A subsequent provisioning call flow is initiated. The eSIM server assists the eUICC to recover from the error event based on the state information of the eSIM server, the device and/or the eUICC. In some embodiments, the recovery and subsequent successful profile installation makes use of the otPK generated during the earlier provisioning call flow.

20 Claims, 10 Drawing Sheets

(51) Int. Cl.
*H04L 9/32* (2006.01)
*H04W 12/02* (2009.01)
*H04W 12/04* (2009.01)
*H04W 12/06* (2009.01)
*H04W 12/00* (2009.01)

(52) U.S. Cl.
CPC ........ *H04L 9/3273* (2013.01); *H04L 63/0435* (2013.01); *H04L 63/067* (2013.01); *H04L 63/0853* (2013.01); *H04W 12/0023* (2019.01); *H04W 12/02* (2013.01); *H04W 12/04* (2013.01); *H04W 12/06* (2013.01); *H04L 2463/061* (2013.01)

(58) Field of Classification Search
CPC ............... H04L 63/0435; H04L 63/067; H04L 63/0853; H04L 2463/061; H04W 12/04; H04W 12/06

USPC ........ 713/159, 168, 172, 189; 380/277, 282, 380/285

See application file for complete search history.

(56) References Cited

U.S. PATENT DOCUMENTS

| | | | | |
|---|---|---|---|---|
| 9,730,072 | B2* | 8/2017 | Yang | ..................... H04W 12/06 |
| 9,998,925 | B2* | 6/2018 | Yang | ..................... H04W 12/06 |
| 2014/0237101 | A1* | 8/2014 | Park | ..................... H04L 67/303 709/223 |
| 2015/0100794 | A1* | 4/2015 | Joye | ........................ H04L 9/008 713/189 |
| 2015/0341791 | A1 | 11/2015 | Yang et al. | |

OTHER PUBLICATIONS

GSM Association, Official Document SGP.22—RSP Technical Specification,, Version 1.0, Jan. 13, 2016, 114 pages.

* cited by examiner

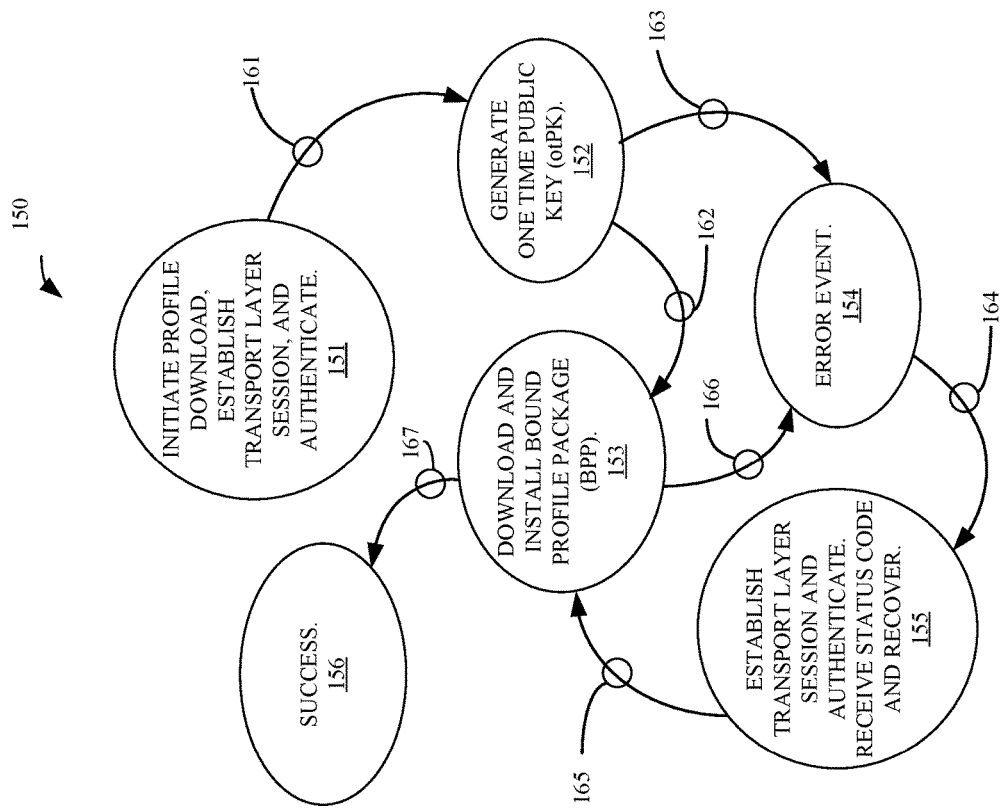
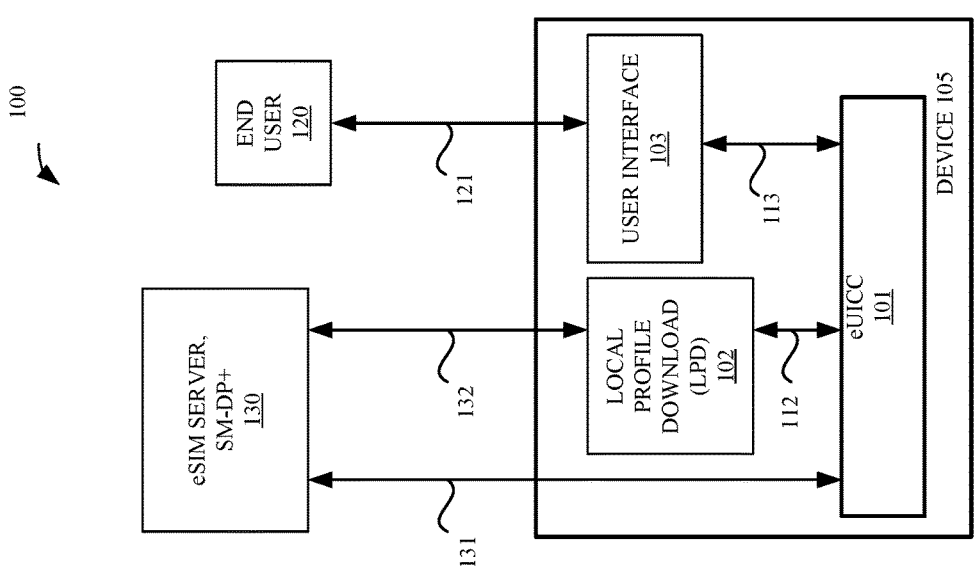
FIG. 1B
FIG. 1A

DOWNLOAD STATE 600

SERVER STATE 610

DEVICE STATE 620 eUICC STATE 630

ELECTRONIC SUBSCRIBER IDENTITY MODULE (ESIM) PROVISIONING ERROR RECOVERY

CROSS-REFERENCE TO RELATED APPLICATIONS

This application claims benefit of U.S. Provisional Patent Application No. 62/340,367, entitled "eSIM PROVISIONING ERROR RECOVERY," filed May 23, 2016, and this application claims benefit of U.S. Provisional Patent Application No. 62/354,554, entitled "ELECTRONIC SUBSCRIBER IDENTITY MODULE (eSIM) PROVISIONING ERROR RECOVERY," filed Jun. 24, 2016, both of which are hereby incorporated by reference herein.

FIELD

The described embodiments relate to recovering from an error during an electronic subscriber identity module (eSIM) provisioning call flow.

BACKGROUND

A wireless device can be provisioned with a profile (also referred to as an eSIM). Various network entities participate in provisioning of an eSIM to an embedded universal integrated circuit card (eUICC), where the eUICC is hosted by a wireless device. To establish trust between communicating entities, public key infrastructure (PKI) techniques can be used. Inefficiencies can arise if an error event occurs during a provisioning call flow designed, for example, to provide a profile to the eUICC.

Aspects of eSIM provisioning include the downloading, installing, enabling, disabling, switching and deleting of a profile on an eUICC or on a universal integrated circuit card (UICC). UICCs and eUICCs are secure elements (SEs) for hosting profiles. A profile is a combination of operator data and applications provisioned on an eUICC in a device for the purposes of providing services by an operator. A profile can contain one or more secure data used to prove identity and thus verify contract rights to services. During assembly of a device, the eUICC can be inserted into the device.

A profile can be identified by a unique number called an ICCID (Integrated Circuit Card Identifier). A wireless operator is a company providing wireless cellular network services. A mobile network operator (MNO) is an entity providing access capability and communication services to its subscribers through a mobile network infrastructure. In some cases, the device is user equipment used in conjunction with an eUICC to connect to a mobile network. An end user or customer is a person using a (consumer or enterprise) device. An enabled profile can include files and/or applications which are selectable over an eUICC-device interface.

Some profile downloads are triggered when a device pulls a notification from a root server, where the notification is first pushed to the root server by an eSIM server. The root server, in some instances, may be referred to as a subscription manager discovery service (SMDS) server. The notification can include an event identifier and an address of the eSIM server. The device proceeds to inquire of the eSIM server about the event identifier, reaching the eSIM server using the eSIM server address of the notification.

SUMMARY

Representative embodiments set forth herein disclose various systems and techniques for recovering from an error during provisioning of an eSIM to an eUICC.

A provisioning call flow may include: i) establishing a transport layer security (TLS) session between the eSIM server and a device, ii) mutual authentication using PKI techniques between the eSIM server and a eUICC embedded in the device, iii) an elliptic curve cryptography key agreement (ECKA) phase including generating one time ECKA key pairs at both the eUICC and the eSIM server, generation of a session key, and encryption of the particular profile assigned to the eUICC (binding), and iv) download of the bound profile package to the eUICC via the device. A session key may be referred to as S-ENC herein.

Various error events can interrupt this provisioning call flow. In some embodiments, a recovery phase is performed by the eSIM server, the device, and/or the eUICC after an error event. After completion of the recovery phase, the profile download and installation is performed based on the recovery activity. In this way, the instances in which the eUICC needs to generate a new otPK are reduced, and the instances in which the eSIM server discards a bound profile package or performs a complicated process to return the profile to inventory are reduced.

An eUICC, in some embodiments, initiates a provisioning operation by contacting an eSIM server. An example of a provisioning operation is the download and installation of a profile. In some embodiments, a provisioning operation can be initiated by recovery of an event identifier from an SMDS server.

An end user, in some instances, has an activation code (AC). The AC includes an eSIM server address and a token (AC_Token). As part of the download operations, the profile will be encrypted by the eSIM server and be placed in or formatted as part of a bound profile package (BPP). The eSIM server, also referred to as a subscription manager data preparation (SMDP, or SM-DP+) performs initial security operations before downloading the bound profile package to the eUICC via the device, where the eUICC is embedded in the device (alternatively, the eUICC is a removable eUICC card present in the device). The initial security operations, in some embodiments, include generation of a one-time ECKA pair (otPK.EUICC, otSK.EUICC). In general, references to otPK are to the public key of this pair, that is, the unqualified name "otPK" refers to otPK.EUICC. The device/eUICC, in some embodiments, then sends the token, an eUICC identifier such as EID, and the otPK.EUICC to the eSIM server. The eSIM server generates a one-time ECKA key pair (otPK.DP, otSK.DP). A session key, S-ENC, is computed by the eSIM server based on otPK.EUICC, otSK.DP, and other information. S-ENC is used by the eSIM server to encrypt the profile; the encrypted profile is part of the bound profile package. The eUICC is able to derive the same session key, S-ENC, based on otPK.DP, otSK.EUICC, and other information. An error event can occur, for example, during the initial security operations during the BPP download and/or during the profile installation from the BPP. An error event is an unpredictable, undesirable, noise-like event. The error event interrupts or stops the progress of the provisioning call flow. Restarting the provisioning steps is inefficient if the eSIM server discards the profile, for example. For security reasons, the otPK.EUICC and thus the session key S-ENC are not used again after completing a successful BPP download and profile installation. In embodiments presented herein, a recovery phase is provided to make use of the bound profile package and/or the already-generated otPK; a risk of replay attack exploiting the recovery phase is protected against by use of the ECKA protocol.

The recovery phase, in some embodiments, is based on reference or state information. The reference or state information is used to re-use or re-commence all or part of provisioning session or provisioning call flow that was interrupted by the error event. Exemplary reference or state information includes the token, the EID, a value related to an otPK and/or the event identifier. The eSIM server can recognize the occurrence of a past error event when it receives a request for a profile from a particular eUICC, for example, when it already has a bound profile for the eUICC. The eUICC can participate in recovery by maintaining a table of unused otPKs indexed by eSIM server identifiers. The eSIM server, in some embodiments, sends a status code to the device/eUICC during, for example, the initial security operations. The status code informs the device/eUICC of whether a fresh otPK is needed from the eUICC, or whether the eUICC is to perform error recovery based on an existing otPK, where the S-ENC based on the otPK has not yet been used for decryption of an encrypted profile within a BPP.

An error event, in some instances, occurs after otPK generation and BPP creation, but before completion of bound profile package download or before confirmation from the eUICC on the installation of the bound profile package.

In some instances, a provisioning call flow occurs as follows. An eSIM server and a device establish a TLS session. The eSIM server and an eUICC in the device then perform mutual authentication. As part of mutual authentication, the eSIM server learns an eUICC identifier, and the eUICC receives a copy of a server PKI certificate, including an identity of the eSIM server. The eSIM server identity, in some embodiments, is an object identifier (OID). The device or eUICC then requests the assistance of the eSIM server with a provisioning function, for example, a BPP download followed by profile installation. For example, in some embodiments, the device sends a profile request to the eSIM server. In some embodiments, the profile request includes an event reference value. Examples of event reference values include an activation token (token from an AC) or an EID of the eUICC.

The eSIM server then checks the reference or state information associated with this eUICC (sometimes referred to as the "target eUICC"). The eSIM server, in some instances, determines that a profile (eSIM) is in a downloadable state. Next the eSIM server determines whether the profile is available for binding (encrypting with an eUICC-specific encryption key) or is already bound to the eUICC (for example, as a bound profile package, BPP). The eSIM server then generates a status code and sends it to the device and/or the eUICC. When the status code indicates a BPP already exists, an eUICC otPK or a hashed value based on the eUICC otPK on which the encryption key is based, in some embodiments, is sent to the device and/or eUICC along with the status code.

The device and/or eUICC receives the status code, and possibly a hashed otPK value. The device and/or eUICC determine an operation type based on whether a fresh otPK is required. The operation type is based on the status code and, in some embodiments, based on eUICC state information. When the operation type indicates a fresh download, the eUICC generates a fresh otPK and continues with the provisioning call flow for a profile download. When the operation type indicates a recovery download, the eUICC does not generate a new otPK. A most recent otPK/otSK pair or an otPK/otSK pair stored on the eUICC matching a server identifier, for example, is used to re-enter the profile download call flow. The matching, in some embodiments, is performed based on an otPK value received from the eSIM server.

In some embodiments, the eUICC stores two or more otPK/otSK pairs. The eSIM server, in some embodiments, sends an otPK identifier, such as the otPK itself or a hash of the otPK to the eUICC. The eUICC compares the received otPK identifier with stored otPKs to find a match. A non-matching otPK is rejected because it may indicate an ongoing replay attack by a malicious party. In some embodiments, the eUICC stores a server identifier with each stored otPK. Based on the server identifier, the eUICC knows which otPK to use in the recovery phase. In some embodiments, the eUICC receives a server identifier and an otPK identifier. The eUICC searches its eUICC state and only uses a matching otPK if the eUICC determines both a server identifier match in the eUICC state and an otPK identifier match in the eUICC state. In some embodiments, when the status code indicates a recovery download, the eUICC uses the last otPK generated by the eUICC.

When the device receives the status code indicating a fresh download, in some embodiments, device logic requests a fresh otPK from the eUICC and proceeds with ECKA steps. This can be, for example, when there is no error event detected. Device state information, in some embodiments, is used to recognize that there is no error event logged in the device. When the status code indicates recovery phase is appropriate, the device requests, in some embodiments, download of the bound profile (BPP). Alternatively, the device, in some embodiments, asks the eUICC for otPK identifying information, such as a hash value. The device then sends the otPK identifying information to the eSIM server to obtain assurance that the eUICC and the eSIM server state are both indicating an identical otPK to be used in proceeding with the provisioning call flow.

The eUICC logic, in some embodiments, checks the otPK.EUICC value in a downloaded profile, for example, in the initialize.secure.channel TLV, to match with an existing otPK in the eUICC. If there is no match, the downloaded profile is rejected as possibly being part of a replay attack by a malicious party. Alternatively, the eSIM server does not need to indicate the otPK.EUICC in a profile TLV. The eSIM server, in that case, in some embodiments, will still use the otPK.EUICC in a signature calculation.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

FIG. 1A illustrates an exemplary system for provisioning an eUICC, according to some embodiments.

FIG. 1B illustrates an exemplary state diagram for the system of FIG. 1A recovering from an error event, according to some embodiments.

DETAILED DESCRIPTION

Figure 2:
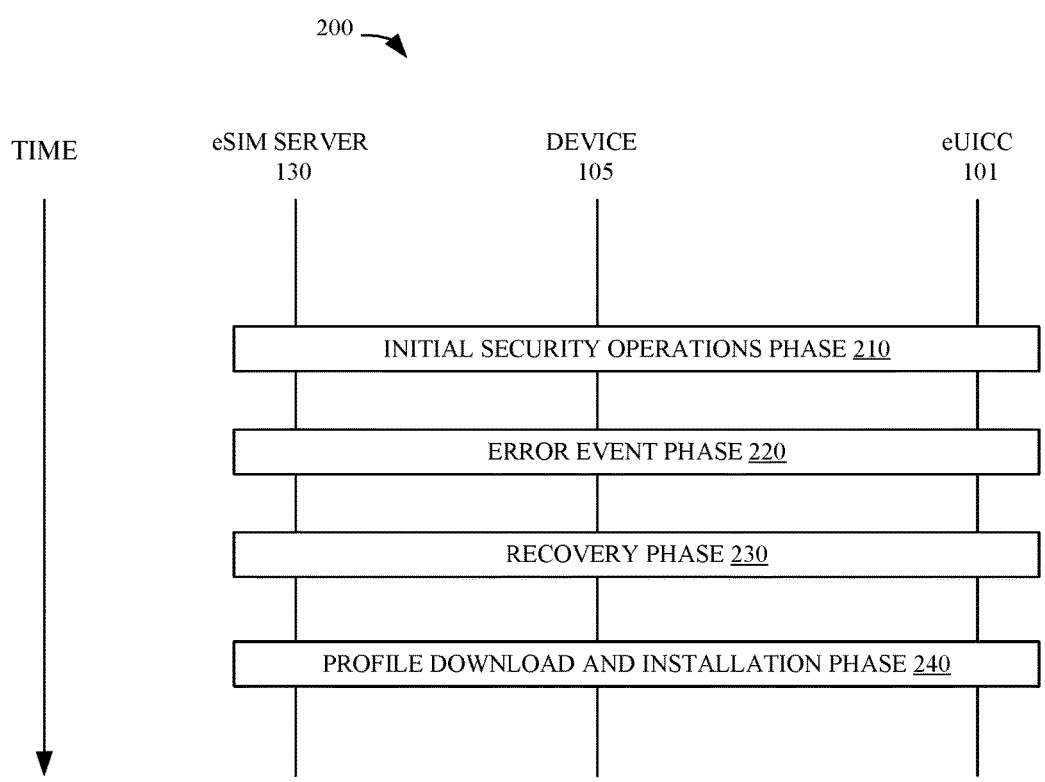
FIG. 2 illustrates exemplary phases in a provisioning call flow including a recovery phase, according to some embodiments.

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

A wireless device can be provisioned with an eSIM. Inefficiencies can occur if an error event occurs during provisioning. Embodiments disclosed herein avoid or mitigate inefficiencies by retaining state information in an eSIM server, a device and/or an eUICC and then recovering from the error event based on the state information. Before describing the methods, servers, and devices involved with this solution, eSIM provisioning and PKI techniques will be described.

eSIM Provisioning

A function which provides profile packages (BPPs) is known as a subscription manager data preparation (SM-DP, or SM-DP+). An SM-DP may also be referred to as a profile provider, an eSIM server, or as an eSIM vendor. An eSIM is an electronic SIM. A physical SIM can be an electronic card, which can be inserted into a wireless device. An eSIM is an example of a profile. A profile package can be a personalized profile using an interoperable description format that is transmitted to an eUICC as the basis for loading and installing a profile. Profile data which is unique to a subscriber, e.g., a phone number or an International Mobile Subscriber Identity (IMSI), are examples of personalization data. The eSIM server communicates over an interface with an eUICC. Certificates used for authentication and confidentiality purposes can be generated by a trusted certificate issuer.

Further details of remote provisioning and management of eUICCs in devices can be found in GSM Association document GSMA SGP.22: "RSP Technical Specification," Version 1.0 Jan. 13, 2016 (hereinafter "SGP.22").

eUICC Description

An eUICC includes an operating system, and the operating system can include ability to provide authentication algorithms to network access applications associated with a given operator. The operating system also can include the ability to translate profile package data into an installed profile using a specific internal format of the eUICC. An ISD-P (issuer security domain-profile) can host a unique profile within an eUICC. The ISD-P is a secure container or security domain for the hosting of the profile. The ISD-P is used for profile download and installation based on a received bound profile package. A bound profile package is a profile package which has been encrypted for a target eUICC. An ISD-R (issuer security domain-root) is a function in a eUICC responsible for the creation of new ISD-Ps on the eUICC. An ECASD (eUICC controlling authority security domain) provides secure storage of credentials required to support the security domains on an eUICC. A controlling authority security domain (CASD) may also be referred to as a "key store" herein. A security domain within the eUICC contains the operator's over the air (OTA) keys and provides a secure OTA channel. OTA keys are credentials used by an operator for remote management of operator profiles on an eUICC.

Some activities related to an eUICC resident in a device may be performed by the device. Examples of such activities are profile download assistance and local user interface functions. More information on profile download assistance and local user interface functions can be found in SGP.22.

Public Key Infrastructure Techniques

Communications of an eUICC may be authenticated using PKI techniques. The techniques disclosed herein are applicable to eUICCs, UICCs, and SEs. Certificates used for authentication and confidentiality purposes can be generated by a trusted certificate issuer (CI or root CA). A public-key certificate may also be referred to herein simply as a certificate.

A user may store a copy of a certificate, where the certificate holds the name of a given party (user identity). The public key recorded in the certificate can be used to check the signature on a message signed using a PKI private key of the given party. A user or message recipient may use an on-line protocol such as on-line certificate status protocol (OCSP) to determine if a certificate is valid.

The eUICC operating system can include ability to provide authentication algorithms to network access applications associated with a given operator. The operating system also can include the ability to translate profile package data into an installed profile using a specific internal format of the eUICC. An ECASD provides secure storage of credentials required to support the security domains on the eUICC. A controlling authority security domain (CASD) may also be referred to as a "key store" herein.

Elliptic Curve Cryptography Key Agreement (ECKA)

An eUICC can generate a one-time public key otPK.eUICC.ECKA and an eSIM server can generate a one-time public key otPK.DP.ECKA (with their respective one time private keys otSK.[eUICC or DP].ECKA) to create an input for a Key Derivation process to create a session key for encryption, S-ENC. More details of key derivation can be found in SGP.22. The otPK.eUICC.ECKA is referred to herein as otPK or otPK.eUICC. The eSIM server otPK may be referred to herein as otPK.DP.

System

FIG. 1A illustrates an exemplary system 100 for recovering from an error event while an eSIM server 130 is provisioning an eUICC 101. The eUICC 101 is in a device 105 used by an end user 120. The device 105 includes a user interface 103 and a local profile download (LPD) function 102. Software for operating LPD 102 and user interface 103 is provided by the device operating system, not shown. The eSIM server 130 communicates with the device 105 via an interface 131, also referred to as an ES8 interface. The ES8 interface is realized by interface 132 (also called ES9) and interface 112 (also called ES10). LPD 102 and user interface 103 are sometimes referred to collectively as local profile assistant (LPA). The end user 120 communicates with the user interface 103 via interface 121 and the user interface 103 communicates with the eUICC 101 via interface 113.

FIG. 1B illustrates a state diagram 150 of activities and states related to error recovery from an error event during a provisioning call flow, according to some embodiments. The state diagram 150 is schematic in nature for clear presentation of events. At 151, possibly based on input from the end user 120, the device 105 initiates a profile download, and the device 105 establishes a TLS session with the eSIM server 130. The eUICC 101 then performs mutual authentication with the eSIM server 130 based on PKI techniques. Events then progress through the state diagram via transition 161 to state 152. At 152, the eUICC generates an otPK as part of an ECKA process and subsequent symmetric key for encryption, S-ENC. In a normal case, activities then flow via transition 162 to state 153 in which a bound profile package (BPP) is downloaded from the eSIM server 130 to the eUICC 101 and installed in the eUICC 101. Successful installation of the BPP is indicated as a transition 167 reaching success state 156.

In some instances an error occurs during the provisioning call flow. Exemplary error events are represented in state diagram 150 as a transition 163 to a state 154 and as a transition 166 to the state 154. Errors, in some instances, are reported on the ES9 and ES10 interfaces. Some additional error event scenarios are as follows. There could be a communication failure between the LPA and the eSIM server 130. End user 120 might remove the eUICC 101, if it is a removable eUICC card. End user 120 might remove a battery from the device 105 or switch off the power during the provisioning call flow. A software failure could crash one or more processors or functions in the device 105.

Embodiments described herein mitigate the trouble caused by these error events. From error event state 154, the state diagram 150 transitions by transition 164 to state 155. State 155 is like state 151 except that the eSIM server 130 assists the eUICC 101 to recover from the error event that occurred. In particular, the eSIM server 130, in some embodiments, avoids the creation of a new otPK by the eUICC 101 and avoids discarding or replacing to inventory an already-created BPP (profile encrypted for decryption by the eUICC 101).

Phases: Provisioning Call Flow with Error Recovery

FIG. 2 illustrates phases of a provisioning call flow including recovering from an error during the provisioning call flow, according to some embodiments. The eSIM server 130 is in communication with the device 105 and the eUICC 101. Time advances from top to bottom. Phases, sometimes including groups of messages, are shown as boxes spanning the entity timelines; individual messages are not shown in FIG. 2. An initial security operations phase 210 includes i) establishment of a TLS session between the device 105 and the eSIM server 130, ii) mutual authentication between the eSIM server 130 and the eUICC 101, iii) otPK generation at the eUICC 101 as part of ECKA, and iv) transmission of the otPK to the eSIM server 130 for derivation of S-ENC. Encryption of a selected profile with S-ENC to create a BPP for download to the device 105 and installation at the eUICC 101 might or might not occur before error event phase 220, depending on circumstances. A variety of error scenarios are mentioned above, and error events by their nature occur randomly in time with respect to the progress of the provisioning call flow events. Error event phase 220 is a degraded situation; there are not particular error event messages flowing in the box labelled 220. At recovery phase 230, the eSIM server 130, the device 105, and/or the eUICC 101 use a variety of state information to recommence the provisioning call flow without re-generation of an otPK.EUICC, in some instances. At 240 profile download and installation occurs after the recovery phase 230. In some instances, not shown, profile download and installation fails and a recovery phase occurs subsequently. In some instances phases 220 and 230 may follow phase 240 (see the FIG. 1B transitions 166, 164, 165, and 167).

Message Groups, Error Event and Recovery

Figure 3:
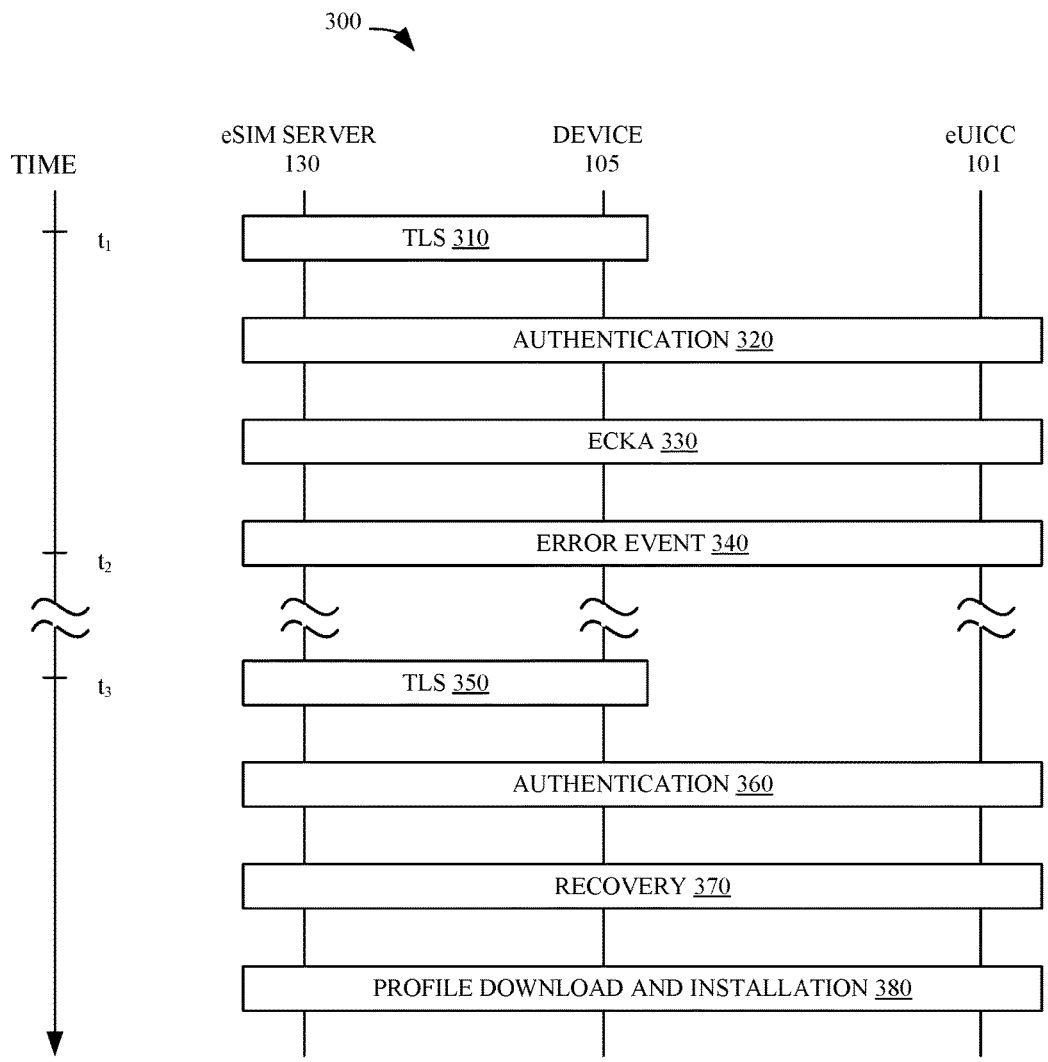
FIG. 3 illustrates exemplary groups of messages including recovery from an error event, according to some embodiments.

FIG. 3 illustrates groups of messages 300 showing error recovery during a profile provisioning call flow, according to some embodiments. The device 105 determines that a provisioning call flow should be initiated, possibly based on input from the user 120 (not shown). Alternatively, the call flow could be triggered by pulling an event identifier from an SMDS server (not shown). The figure begins at a time $t_1$ with the TLS 310 group of messages between the eSIM server 130 and the device 105. Next mutual authentication 320 occurs between the eUICC 101 and the eSIM server 130. Futher details of authentication between an eSIM server and eUICC can be found in SGP.22. ECKA process 330 has begun or completed before $t_2$ at which time the error event 340 occurs. In some instances, not shown, profile download and installation may occur before error event 340; see FIG. 1B transitions 166, 164, 165, and 167 mentioned above with respect to FIG. 2 phase 240. The wavy lines in the middle of the figure on the time axis represent an indefinite time duration after the error event 340. Error event 340 corresponds to error event phase 220 of FIG. 2. At time $t_3$, perhaps based on user input or based on pulling the same event identifier from the SMDS server, a second TLS session 350 is commenced between the eSIM server 130 and the device 105. This is followed by authentication messages 360 similar to those of authentication 320. By these authentication messages, the eSIM server 130 reliably learns the identity of the eUICC 101 and the eUICC reliably identifies (or confirms) the eSIM server 130. TLS 350, authentication 360 and recovery 370 occur during recovery phase 230 of FIG. 2. Recovery 370 then occurs followed by profile download and installation 380 (corresponding to profile download and installation phase 240 of FIG. 2).

Example Server Method

In some embodiments, an eSIM server method includes performing a first session handshake with a device to establish a first TLS session including determining a first TLS session key. The eSIM server then sends a first session token to the device using the first TLS session key. At some point an error event occurs. Then the eSIM server receives an event identifier from the device and determines a profile type based on the event identifier. Next, the eSIM server receives an otPK value from an eUICC via the device. The eSIM server generates ECKA session key based on the otPK value and receives a request to establish a second TLS session with the device and performs a second session handshake with the device (see 350 of FIG. 3). Performing the second session handshake includes determining a second TLS session key. The eSIM server, in some embodiments, receives a second session token from the device and determines that the second session token matches the first session token. The eSIM server is now in recovery phase 370 of FIG. 3. The eSIM server sends the device a status code, wherein i) the status code comprises a status code value, and ii) the status code value indicates that the eSIM server is following a recovery procedure. The encrypted profile is encrypted by the eSIM server with the ECKA session key. Next, the eSIM server sends the encrypted profile of the profile type to the eUICC via the device. These steps may be re-ordered or used in various combinations.

Example Device Method

The device performs operations in conjunction with the eSIM server and the eUICC in order to recover from an error event. In some embodiments, a device method includes: obtaining an event identifier from an SMDS server and performing a first session handshake with an eSIM server to establish a first TLS session including a first TLS session key (see 310 of FIG. 3). The device receives a session token from the eSIM server. The device is attempting to perform operations based on the information it learned from the SMDS server, so it sends the event identifier to the eSIM server. The device then sends an otPK value from the eUICC to the eSIM server and generates an ECKA session key (S-ENC) based on the otPK value (see 330 of FIG. 3). At some point error event 340 occurs. The device then sends a request to establish a second TLS session with the eSIM server (see TLS 350 of FIG. 3) and performs a second session handshake with the eSIM server to establish a second TLS session including a second TLS session key. The device sends the session token to the eSIM server and receives a status code (the eSIM server is performing error recovery, FIG. 3 370). In particular, the status code comprises a status code value, and the status code value indicates that the eSIM server is following a recovery procedure. The device then receives an encrypted profile from the eSIM server, wherein the encrypted profile is encrypted with the ECKA session key. These steps may be re-ordered or used in various combinations.

Logic: Existing or Fresh otPK

Figure 4:
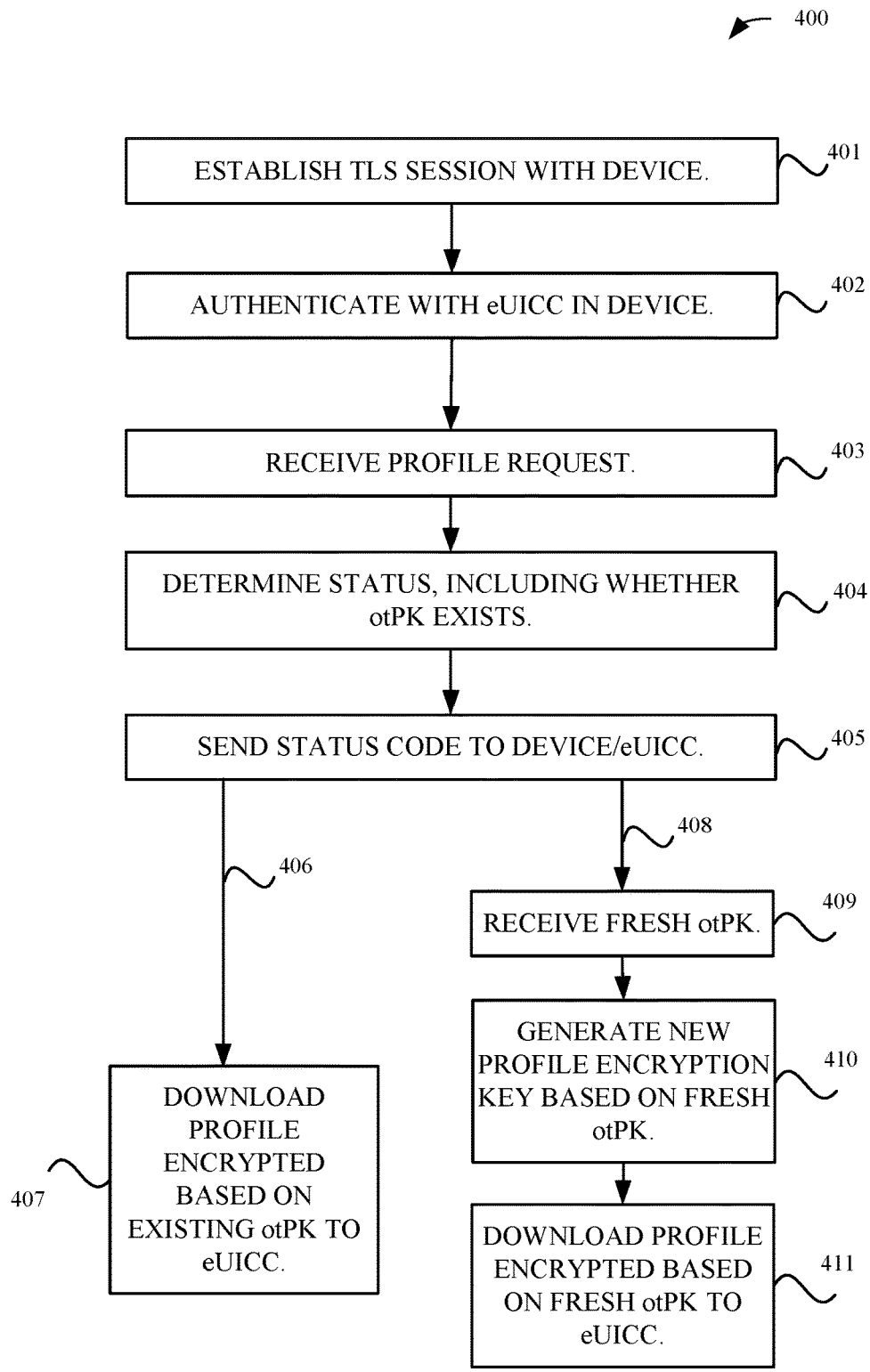
FIG. 4 illustrates exemplary logic of an eSIM server sending a status code to a device and/or an eUICC, according to some embodiments.

FIG. 4 illustrates eSIM server logic 400 for a provisioning call flow with error recovery, according to some embodiments. At 401, an eSIM server establishes a TLS session with a device. At 402, the eSIM server authenticates with an eUICC in the device; in some embodiments, this includes the device sending an InitiateAuthentication command to the eSIM server and sending a AuthenticateServer command to the eUICC based on the eSIM server response. At 403, the eSIM server receives a profile request. In some embodiments, 403 is in the form of receiving a AuthenticateClient message. At 404, the eSIM server uses state information to determine whether an otPK exists before commencing the ECKA process. At 405, the eSIM server then sends a status code to the eUICC. Two versions of the status code are illustrated in FIG. 4, one sent as shown by path 406 and the other by path 408. If the eSIM server determines that no error event has occurred with respect to the requested profile from the particular eUICC, then the logic flows along path 408 to 409. The status code represented by 408 indicates that this is a normal download and that the eUICC should proceed with ECKA, in particular, by generating a fresh otPK. At 409, the eSIM server receives the fresh otPK, and generates a new profile encryption key (S-ENC) based on the fresh otPK at 410. After 410, the eSIM server downloads via the device to the eUICC the profile encrypted based on the fresh otPK.

Path 406 is in contrast to path 408. In particular, if the eSIM server determines that an otPK.eUICC.ECKA already exists (an already-generated Bound Profile Package encrypted using keys generated from ECKA based on otP-K.eUICC.ECKA may also already exist) without need of commencing ECKA again, then the status code sent after 405 by path 406 indicates that there will be no otPK generation and a most recent or matching otPK will be used. After sending a status code indicating a recovery mode (the path 406), the eSIM server downloads at 407 a profile to the eUICC (via the device), where the profile is encrypted based on an existing otPK. A downloaded profile is then installed after either of 407, 411 (not shown). An error event may occur during the download 411 (and installation, not shown), in which case, in some embodiments, logic flow 401, 402, 403, 404, 405, and path 406 to 407 occurs.

Profile Encrypted Offline

Figure 5:
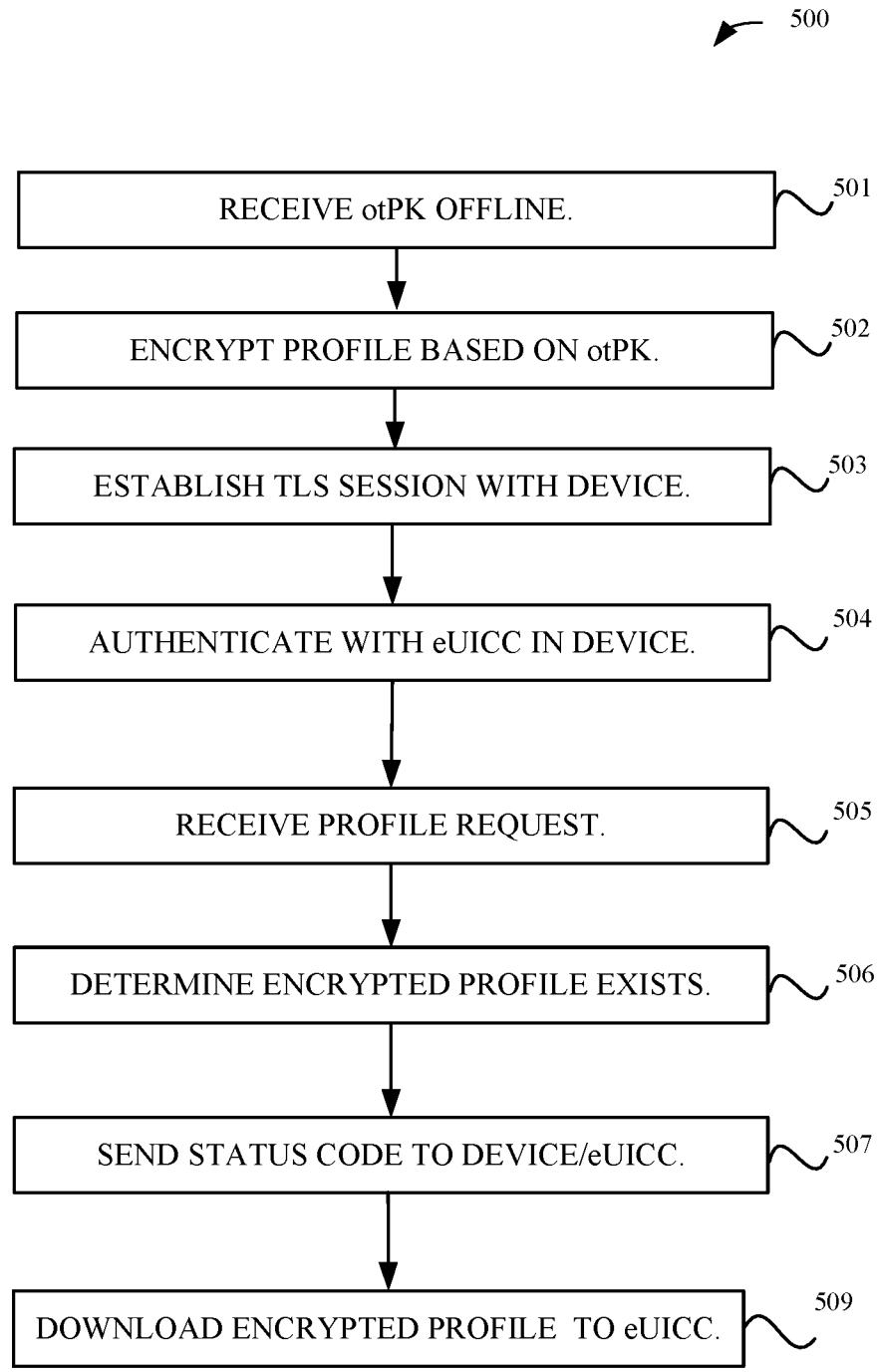
FIG. 5 illustrates exemplary logic for preparing an encrypted profile offline for a particular eUICC, according to some embodiments.

The protocols and states described with respect to an error event are also useful in a scenario in which an eSIM server has received an otPK offline. This is useful, for example, in a product launch scenario in which one million devices are sold in a short time and most of the devices will promptly execute a provisioning call flow. Before the launch of the product occurs (before the devices appear at retail outlets for purchase) the eSIM server can be provided with a large number (e.g., one million) of otPKs corresponding to individual eUICCs with unique eUICC identities. Within each device being one of the eUICCs. The eSIM server can then, offline, prepare specific S-ENC values and individually encrypt profiles to create unique BPPs, one for each otPK of the large number of otPKs. Offline means that the BPPs are created before a profile download request arrives from a device. Exemplary logic 500 with respect to an eSIM server receiving an otPK offline is provided in FIG. 5.

At 501, an eSIM server receives, offline, an otPK. At 502, the eSIM server encrypts a profile using an S-ENC based on the otPK. In some embodiments, 502 occurs before a product launch. At 503, the eSIM server establishes a TLS session with a device. In some embodiments, 503 occurs after a product launch. At 504, the eSIM server performs mutual authentication with the eUICC corresponding to the otPK. At 505, the eSIM server receives a profile request. In some embodiments, this request can be in the form of a GetBoundProfilePackage. At 506, the eSIM server determines that an encrypted profile already exists. At 507, the eSIM server sends a status code to the device indicating that an existing otPK has been used to create the symmetric encryption key (S-ENC). At 509, the eSIM server downloads the profile that was encrypted offline to the eUICC, via the device. The eUICC then decrypts the encrypted profile (BPP) using the S-ENC (the device derives S-ENC based on the otSK and other information).

Reference, or State, Information

Figure 6A:
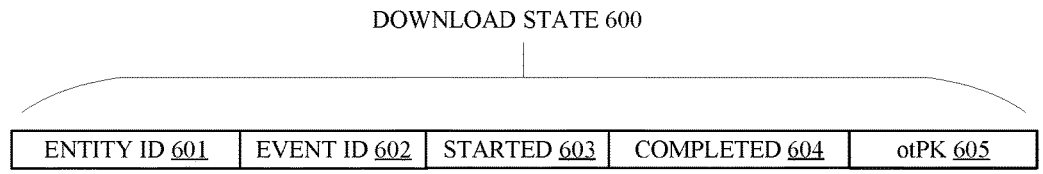
FIG. 6A illustrates exemplary state types related to error recovery, according to some embodiments.

FIG. 6A illustrates exemplary download state information 600, part or all of which is used in the eSIM server 130, the device 105 and/or the eUICC 101 to assist in performing the error recovery referred to, for example, in FIG. 1B state 155, FIG. 2 recovery phase 230, recovery 370 of FIG. 3, and/or 404 of logic 400 in FIG. 4. This information is discussed with respect to profile download, but is not limited to profile download. The information is useful for recovery from an event during a provisioning call flow. The overall concept illustrated is that of using an already-generated otPK, despite the occurrence of an error event. FIG. 6A illustrates fields Entity ID 601, Event ID 602, Started 603, Completed 604, and otPK 605. Fields 601, 602, 603, 604, and 605 are associated together and associated with a particular provisioning call flow. The state information in these fields, in some embodiments, is stored in particular memory areas of one or more of the eSIM server 130, the device 105, or the eUICC 101. In some embodiments, these fields are associated but not stored together. Entity ID 601 is an illustrative variable type representing an identifier of a communicating entity. Event ID 602 is an illustrative variable type representing an event or transaction identifier. Started 603 is a representative variable type that, when populated with a non-NULL value, indicates that a provisioning call flow associated with the Entity ID 601 and/or the Event ID 602 has commenced. A NULL value indicates zero or FALSE or empty. A non-NULL value is an asserted value indicating the presence of information, something non-zero, and/or a TRUE logical value. Completed 604 is a representative variable type indicating, when populated with a non-NULL value, that a provisioning call flow associated with the Entity ID 601 and/or the Event ID 602 has completed successfully. otPK 604 is a representative variable type populated with a non-NULL value when a provisioning call flow has commenced but not completed. otPK 604 need not be an actual entire otPK key, rather, it identifies an otPK. For example, the variable otPK 605, in some embodiments, is a representative variable of a hash value resulting from calculating a hash over an actual otPK key. In some embodiments, otPK 605 only holds a non-NULL value if an undelivered BPP associated with an otPK is present in the eSIM server 130. In some embodiments, such a BPP would be created at ECKA 330 of FIG. 3 but be undelivered or delivered but not successfully installed due to an interruption of the provisioning call flow by error event 340. In some embodiments, not all representative variables are used. In some embodiments, some entities do not retain download state information. In some embodiments, variables of type download state 600 are built up during initial security operations phase 210 of FIG. 2 and made use of during recovery phase 230 of FIG. 2.

Figure 6B:
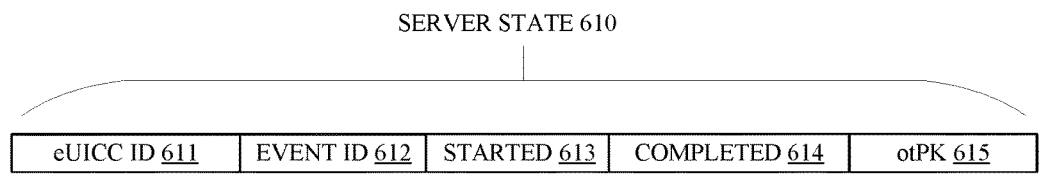
FIGS. 6B, 6C, and 6D illustrate exemplary server state, device state and eUICC state, respectively, according to some embodiments.
Figure 6C:
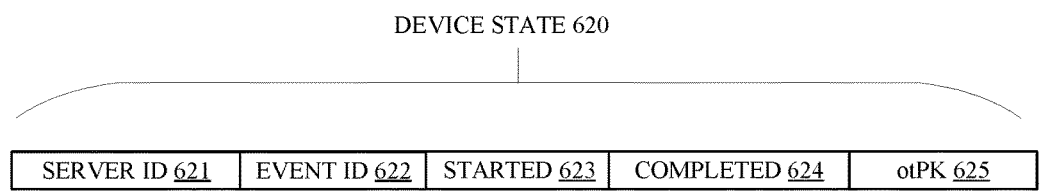
Figure 6D:
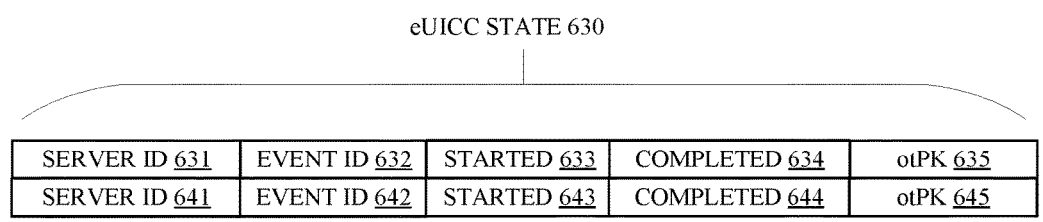

FIGS. 6B, 6C, and 6D illustrate instances or instantiations of the representative variable types of FIG. 6A.

Server State 610

In FIG. 6B, server state 610 of eSIM server 130 comprises state information eUICC ID 611 (an instance of Entity ID 601), Event ID 612 (an instance of Event ID 602), Started 613 (an instance of Started 603), Completed 614 (an instance of Completed 604), and/or otPK 615 (an instance of otPK 605). In an exemplary embodiment, eUICC ID 611 of server state 610 is populated with the EID of eUICC 101 after the authentication 320 message group of FIG. 3. The Event ID 612, in some embodiments, is populated with a transaction ID generated by the eSIM server 130 during authentication 320. In some embodiments, the Event ID 612 is populated with an event identifier supplied by the device 105 or the eUICC 101, wherein the event identifier was obtained as part of a notification from an SMDS server. After authentication 320, the state information Started 613, in some embodiments, is asserted with a TRUE Boolean value, or with another non-NULL value, for example, a timestamp (before successful profile installation, Completed 614 holds a default NULL value). After the ECKA message group 330 has commenced, in some instances, the eSIM server 130 has received an otPK from the eUICC 101 and the otPK value, a hash of it, a pointer to it, or some other non-NULL value, in some embodiments, is stored in state information 615. Error event 340 occurs at time t.sub.2 in FIG. 3. Server state 610 survives the error event 340. At a time t.sub.3, a provisioning call flow commences with TLS 350. After authentication 360, the eSIM server is able to recognize, based on the identity of the eUICC authenticated in authentication 360 and the value of eUICC ID 611 in server state 610, that it (eSIM server 130) is talking with an eUICC with a provisioning call flow which had started (based on Started 613 being non-NULL but Completed 614 being a NULL value). Recovery 370, in some embodiments, is performed by the eSIM server 130 sending a status code to the device 105 and/or the eUICC 101. The eSIM server 130, in some embodiments, bases the status code on server state 610. In some instances, eSIM server 130 will find that Started 613 is asserted, while Completed 614 represents a NULL value. Based on this, the eSIM server 130 commences recovery, e.g., see FIG. 4-406, if the eUICC ID 611 matches with the eUICC identifier obtained in authentication 360, and/or an event identifier supplied by the device 105 or the eUICC 101 matches with Event ID 612. In some embodiments, assertion of the state information otPK 615 indicates to eSIM server 130 that it has in memory an undelivered BPP encrypted for delivery to the eUICC identified by eUICC ID 611. When the eSIM server 130 has an undelivered BPP, it will send the status code indicating that there will be no otPK generation and a most recent or matching otPK will be used; such a status code is indicated by logic path 406 of FIG. 4. When the eSIM server 130 does not have state information otPK 615, the state information 614 is asserted (non-NULL), it does not find a match for Event ID 612 from communication with the device 105 or the eUICC 101, and/or eSIM server 130 does not find a match for state information eUICC 611, in some embodiments, it will send a status code as indicated by logic path 408 of FIG. 4, indicating that a fresh otPK is to be generated by the eUICC 101.

Device State 620

Device state 620 (FIG. 6C), in some embodiments, is used in a complementary fashion to the use of server state 610 explained above. The device 105, in some embodiments, maintains state information during a provisioning call flow, including message groups TLS 310, authentication 320 and ECKA 330 of FIG. 3. In some embodiments, device 105, in particular LPD 102, participates actively in a provisioning call flow and has some knowledge of message contents. During TLS 310, the device obtains (or confirms) an authenticated identifier of eSIM server 130 and builds device state 620 for a provisioning call flow by populating Server ID 621. This identity, for example, is the server identity provided in the PKI certificate of the eSIM server 130. The device 105, in some embodiments, obtains an event identifier from the eSIM server 130 during authentication 320 or from an SMDS server before sending the profile request received by the eSIM server at 403 in FIG. 4. In some embodiments, the resulting event identifier is stored in Event ID 622. In some embodiments, after sending the profile request (received by the eSIM server 130 at 403) or the initiation of ECKA 330, the device 105 populates state information Started 623 with a non-NULL value. At this point, the state information Completed 624 holds a default NULL value. After commencement of ECKA 330, the device 105, in some embodiments, populates state information otPK 625 with a value related to an otPK generated by the eUICC 101 during ECKA 330. otPK 625, in some embodiments, is a hash value output when the otPK from the eUICC 101 of ECKA 330 is provided as an argument to a hash function. More information on hash functions is available in SGP.22. One or more of the fields of device state 620, in some embodiments, is provided to the eSIM server 130 during the authentication 360 or in the profile request received by the eSIM server at 403 of FIG. 4. Overall, a profile request is sent in initial security operations phase 210 and also in recovery phase 230 of FIG. 2. Correspondingly, a profile request is sent some time before $t_2$ in FIG. 3 and also some time after $t_3$ in FIG. 3. In some embodiments, one or more fields of the device state 620 are provided to the eUICC 101 before sending the profile request.

eUICC State 630

FIG. 6D illustrates exemplary state information eUICC state 630. The eUICC 101, in some embodiments, stores a most recent otPK, the corresponding S-ENC of which has not yet been yet used to decrypt all or a portion of a BPP. For example, in some embodiments, LPA sends BPP TLVs to the eUICC 101 using a LoadBoundProfilePackage instruction over interface 112 (LPA includes LPD 102). A BPP includes session key agreement information and ISD-P creation and configuration information. The BPP is formed in segments, each segment being referred to as a TLV. More information on BPPs can be found in SGP.22. A TLV object is a name for a tag/length/value data object. Each segment (TLV) may include a data part and a message authentication code (MAC) part as well as a tag and a length. The MAC, in some instances, is based on an S-MAC session key distinct from the S-ENC session key. In some embodiments, the eUICC 101 will discard the otPK after decoding one or more security TLVs from the BPP.

FIG. 6D illustrates several features of exemplary eUICC state 630. The first row of FIG. 6D is associated with a first provisioning call flow. In some embodiments, one or more of the elements of the first row are used to promote error recovery. The first row illustrates Server ID 631, Event ID 632, Started 633, Completed 634, and otPK 635. The second row is associated with a different server identifier and refers to a different provisioning call flow than the first row. The eUICC 101, in some embodiments, stores a most recently generated otPK corresponding to an S-ENC that has not been used to successfully complete a provisioning call flow. As an aside, a session encryption key is derived in part based on an otPK.EUICC at the eSIM server, and the eUICC 101 generates the same session key based on otPK.DP and other information. When the S-ENC has not been used to successfully decode a BPP and install the resulting profile, the corresponding otPK.EUICC ("otPK") is referred to herein as "unused" or "existing," FIG. 4-407, or "already-generated" (as opposed to "fresh", FIG. 4-409, FIG. 1B-152). The eSIM server 130 recognizes the occurrence of an error (such as 154 of FIG. 1B, 220 of FIG. 2 or 340 of FIG. 3). In embodiments presented herein, the eSIM server 130 assists the eUICC 101 to avoid generation of a fresh otPK when an unused, existing, or already-generated otPK can be used to complete the provisioning call flow (e.g., state 153 followed by state 156 of FIG. 1B, 240 of FIG. 2, 380 of FIG. 3, and/or 407 of FIG. 4) instead.

eUICC state 630 (FIG. 6D), in some embodiments, is used in a complementary fashion to the use of server state 610 explained above. The eUICC 101, in some embodiments, maintains state information during a provisioning call flow, including message groups TLS 310, authentication 320 and ECKA 330 of FIG. 3. During TLS 310, the eUICC 101 obtains (or confirms) an authenticated identifier of eSIM server 130 and builds eUICC state 630 for a provisioning call flow by populating Server ID 631. This identity, for example, is the server identity provided in the PKI certificate of the eSIM server 130. The eUICC 101, in some embodiments, obtains an event identifier from the eSIM server 130 during authentication 130 or from an SMDS server before sending the profile request indicated by 403 in FIG. 4. In some embodiments, the resulting event identifier is stored in Event ID 632. In some embodiments, after sending the profile request (received by the eSIM server 130 at 403) or the initiation of ECKA 330, the eUICC 101 populates state information Started 633 with a non-NULL value. At this point, the state information Completed 634 holds a NULL value. After commencement of ECKA 330, the eUICC 101, in some embodiments, populates state information otPK 635 with a value related to an otPK generated by the eUICC 101 during ECKA 330. otPK 635, in some embodiments, is a hash value. One or more of the fields of eUICC state 630, in some embodiments, are provided to the eSIM server 130 during the authentication 360 or in the profile request received by the eSIM server at 403 of FIG. 4. In some embodiments, one or more fields of the eUICC state 630 are provided to the device 105 before a profile request is sent to the eSIM server 130. The values stored in Started 633 and Completed 634, are used, in some embodiments, to recognize an uncompleted provisioning call flow and thus the existence of unused otPK, similar to the use of the fields Started 613/623 and Completed 614/624 at the eSIM server 130 and the device 105 as explained above.

The second row of the eUICC state 630 includes Server ID 641, Event ID 642, Started 643, Completed 644, and otPK 645. By having a second row, the eUICC 101 maintains download (provisioning call flow) state information for more than one eSIM server. A device 105 with eUICC 101, in some instances, processes provisioning call flows with two or more servers and so maintains, in some embodiments, download state information of the representative variable type download state 600 for more than one eSIM server.

In some embodiments, the status code represented by logic path 406 of FIG. 4 provides information, such as an identifying hash, of which otPK an eUICC is to use. For example, eUICC 101 searches for a match among otPK 635 and otPK 645 for a match with an otPK identified in the status code. If a match is found, then the eUICC will decode the BPP sent by the eSIM server in FIG. 4-407 using the S-ENC based on the otPK that matched the information sent in the status code. In some embodiments, the eUICC receiving the status code of logic path 406 will compare the server identifier with a server identifier of the eUICC state 630 (such as Server ID 631 or Server ID 641). The server identifier, in some embodiments, is an OID value taken from a server PKI certificate used in authentication. If a match is found, the eUICC 101 will use the S-ENC associated with the otPK indicated in the same row of eUICC state 630 holding the matching Server ID value. These approaches are combined in some embodiments. That is, the eUICC checks the status code against entries in the eUICC state 630 both for a matching Server ID value and matching otPK information within the same row. If matches are found within the same row, the eUICC decodes the BPP with the S-ENC corresponding to the matching otPK information, otherwise, the BPP is rejected as possibly being part of a replay attack by a malicious third party.

When a BPP is downloaded, the eUICC 101, in some embodiments, compares an otPK.EUICC recovered from a TLV in a BPP with otPK values from eUICC state 630 (e.g. otPK 635, otPK 645) for a match. If the otPK.EUICC recovered from the BPP does not match any otPK information from eUICC state 630, the BPP is discarded as possibly being part of a replay attack.

A BPP, in some instances, does not include an otPK or otPK hash value. However, the otPK, in some instances, is used in a signature calculation by the eSIM server 130. The eUICC, in some embodiments, verifies eSIM 130 signature calculations based on one or more existing otPK values stored in the eUICC state 630. If the signature calculation cannot be verified, the corresponding BPP is discarded.

Exemplary Message Sequences

Figure 7A:
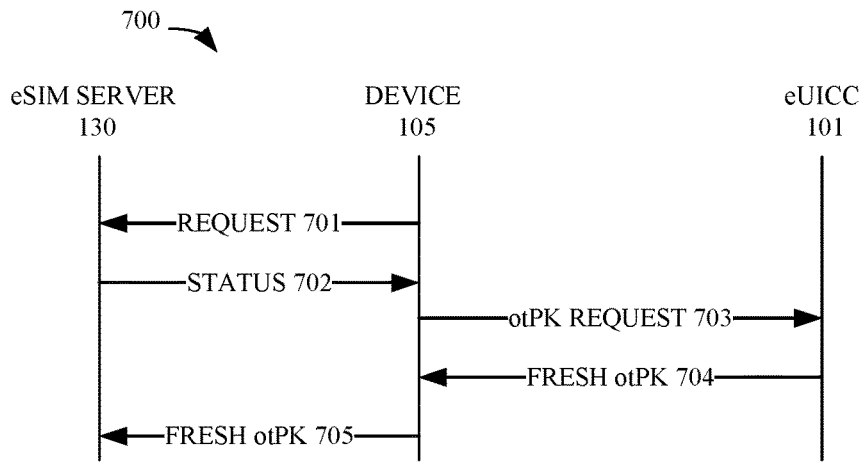
FIGS. 7A, 7B, and 7C illustrate exemplary message sequences according to some embodiments.
Figure 7B:
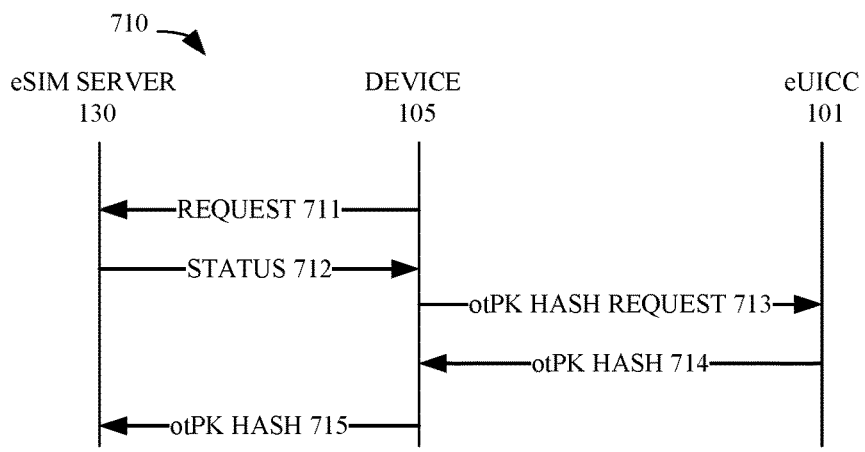
Figure 7C:
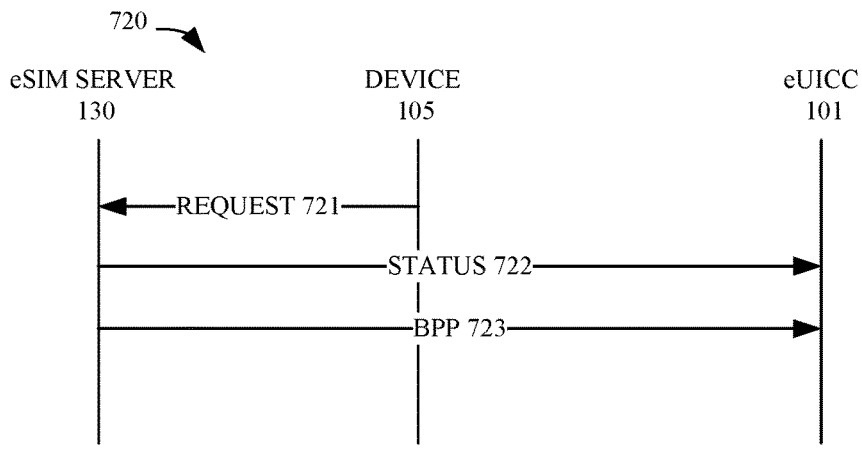

FIGS. 7A, 7B, and 7C provide exemplary message sequences 700, 710, and 720, respectively illustrating various uses of selected information of the type represented by state information of FIGS. 6B, 6C, and 6D. Actions of the eSIM server 130, in some embodiments, are based on download state information obtained from the device 105 and/or the eUICC 101. That is, device 105 and/or eUICC 101 send some or all of its device state 620 or eUICC state 630, respectively to the eSIM server 130 during a provisioning call flow. In some embodiments, the information is sent at the time of sending a profile request.

In FIG. 7A, the eSIM server 130 receives a request 701 from the device 105. Message 701 is similar to 403 of FIG. 4. In this example, server state 610 indicates to the eSIM server 130 that the request is not related to an earlier provisioning call flow crashed by an error event. The eSIM server 130 then sends a status code indicated as status 702 to the device 105. This is similar to logic path 408 of FIG. 4. The device 105 then sends an otPK request 703 to the eUICC 101. The eUICC 101, based on the status code indicating a request for a fresh otPK, generates and sends a fresh otPK as indicated by message 704 to the device 105. The device 105 forwards the fresh otPK as message 705 (similar to 409 of FIG. 4). ECKA procedures occur similar to FIG. 4-410 and then a BPP is downloaded, similar to 411 of FIG. 4, and installed. Successful installation places the provisioning call flow at state 156 of FIG. 1B.

In FIG. 7B, request 711 is sent to the eSIM server 130, similar to the request received in 403 of FIG. 4. In this example, eSIM server determines based on server state 610 that an existing otPK exists and seeks validation from the eUICC 101. The eSIM server 130 sends a status message 712 indicating that the device should obtain a hash of an existing otPK from the eUICC 101. The device makes the request as message 713. The eUICC 101 matches the server ID 631 to obtain otPK 635 and sends otPK 635 as a hash value in message 714 or simply sends a hash of an existing otPK in message 714. The device forwards the otPK hash value in message 715. If the eSIM server 130 is satisfied with the otPK hash value received in the message 715, then the recovery procedure proceeds (for example with the status code of logic path 406, followed by the download of 407).

FIG. 7C illustrates an example in which the eSIM server sends a status code to use an existing otPK and follows this with downloading a BPP. Specifically, a request 721 is received by the eSIM server, similar to 403 of FIG. 4. Based on server state 610 of FIG. 6B related to the eUICC 101, the eSIM server 130 sends a status code in message 722, similar to logic path 406 of FIG. 4. The eSIM server then sends a BPP (similar to 407 of FIG. 4) encrypted with an S-ENC associated with otPK 615 of FIG. 6B. The eUICC then decodes the BPP using an S-ENC corresponding to otPK 615 and installs the resulting profile. Successful installation, not shown, places the provisioning call flow at state 156 of FIG. 1B.

eUICC Details

Figure 8:
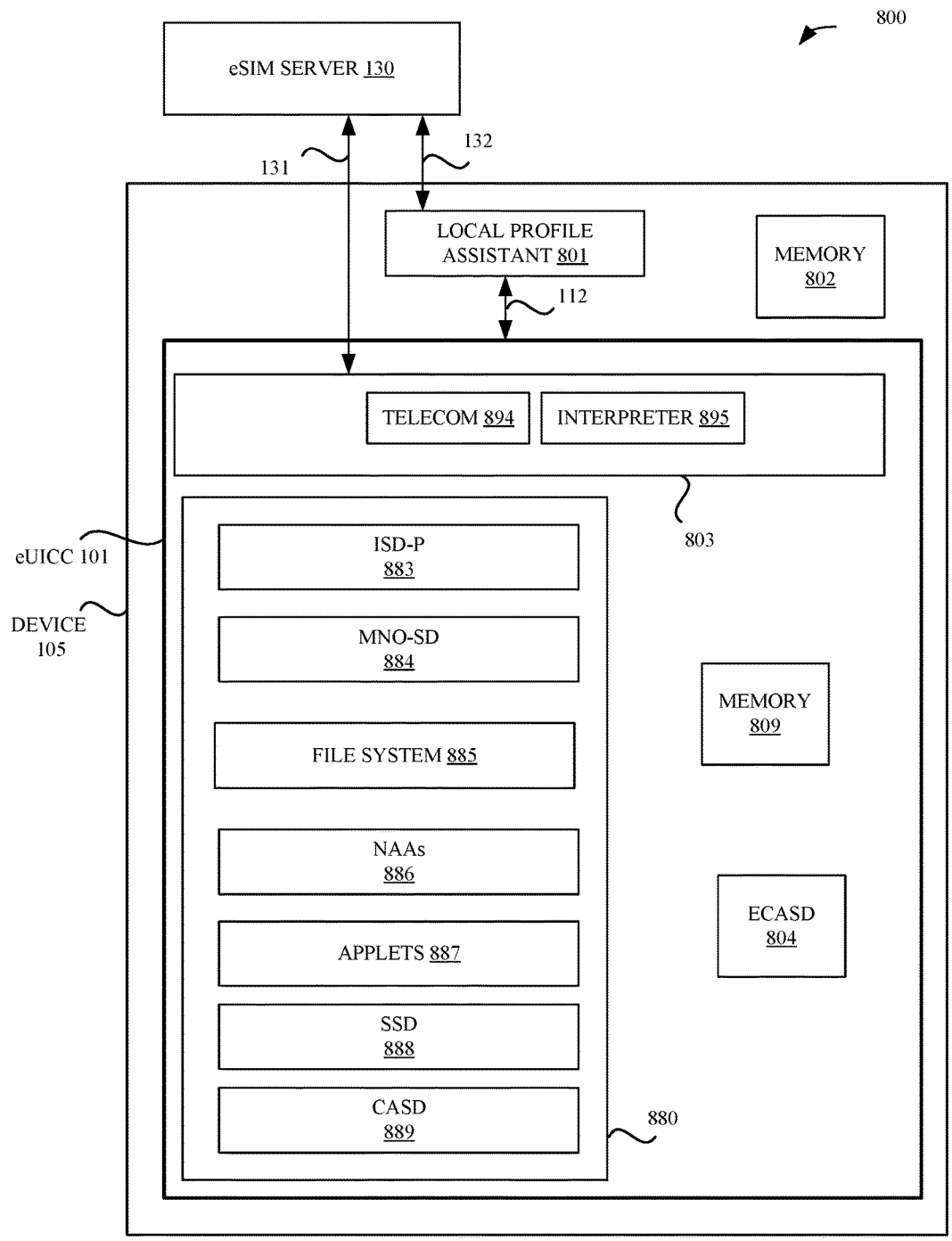
FIG. 8 illustrates an exemplary profile and other components described herein, according to some embodiments.

FIG. 8 illustrates a system 800 with details of the eUICC 101 including a profile 880. The profile 880 is deployed as part of a BPP to the eUICC 101 via the device 105, for example, as illustrated in FIG. 1B-153 (download and install), FIG. 1B-156 (success), FIG. 2-240, FIG. 3-380, FIG. 4-407 or FIG. 4-411, FIG. 5-509, and/or FIG. 7C BPP 723. The eUICC 101 includes an operating system 803. Within the operating system 803 is a telecom framework 894 which provides authentication algorithms to network access applications (such as NAAs 886). Interpreter 895 translates profile package data into an installed profile using a specific internal format of the eUICC 101. ISD-P 883 hosts the profile 880. Profiles can also be referred to as eSIMs. The ISD-P is a secure container (security domain) for the hosting of the profile 880. The ISD-P is used for eSIM download and installation in collaboration with the interpreter 895 for the decoding of a received bound profile package (BPP). An ISD-R (not shown) on the eUICC 101 is responsible for the creation of new ISD-Ps on the eUICC 101 and the lifecycle management of all ISD-Ps on the eUICC 101. ECASD 804 provides secure storage of credentials required to support the security domains on eUICC 101. The various keys described herein, for example, otPK.EUICC and/or S-ENC, are stored in the ISD-R in some embodiments. In some embodiments, one or more of the keys described herein are stored in the ECASD 804. MNO-SD 884 is the representative on the eUICC 101 of the operator providing services via the profile 880 to the end user 120. The MNO-SD 884 contains the operator's OTA keys and provides a secure OTA channel. Further description of profile management in a consumer device can be found in SGP.22.

Example Device Connections

Figure 9:
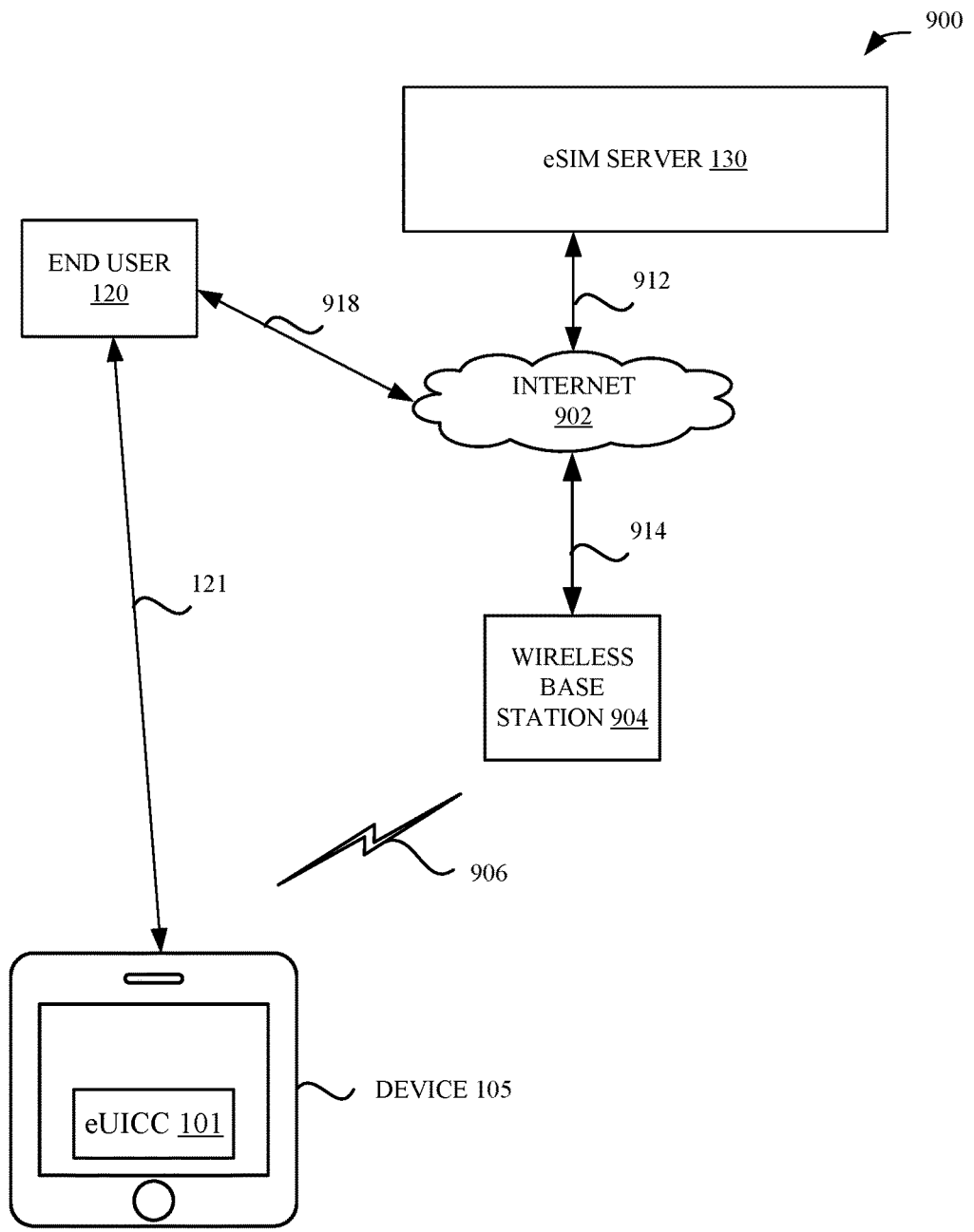
FIG. 9 illustrates a device with eUICC in communication with an end user and with an eSIM server, according to some embodiments.

FIG. 9 illustrates example connection methods for recovery from an error event during a provisioning call flow in a system 900. End user 120 can manage device 105 using interface 121 which can convey end user actions such as requesting a new carrier plan which can trigger request 701, 711, or 721 of FIGS. 7A, 7B, and 7C, respectively. The end user 120 can also remotely manage device 105 via the Internet 902 using interface 918. The device 105 is shown connected to a wireless base station 904. The wireless base station 904 communicates with the device 105 via a wireless link 906. The wireless base station 904 can be an Institute of Electronic and Electrical Engineers 802.11 Wireless Fidelity (IEEE 802.11 Wi-Fi) access point (AP) or the wireless base station 904 can be, for example, a cellular mobile network base station. Examples of cellular mobile network base stations are a 2G or 3G base station or an LTE eNode B. After download and successful installation of the profile 880, the end user 120 can now enjoy a requested carrier plan or a requested wireless service using the profile 880.

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative Exemplary Apparatus

Figure 10:
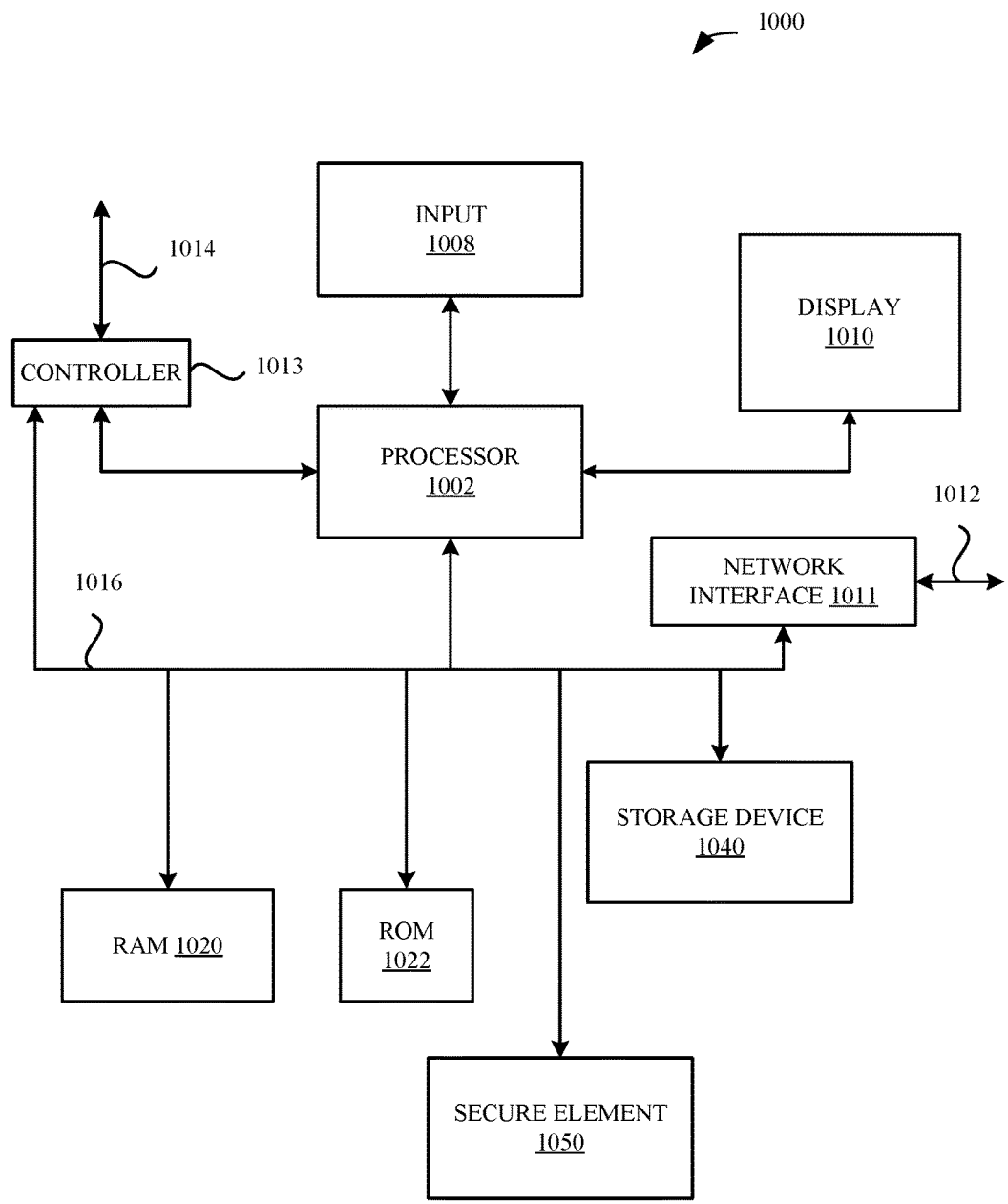
FIG. 10 illustrates an exemplary apparatus for implementation of the embodiments disclosed herein, according to some embodiments.

FIG. 10 illustrates in block diagram format an exemplary computing device 1000 that can be used to implement the various components and techniques described herein, according to some embodiments. In particular, the detailed view of the exemplary computing device 1000 illustrates various components that can be included in one or more of the device 105, the eUICC 101, and/or the eSIM server 130 illustrated in FIGS. 1A, 8, and 9. As shown in FIG. 10, the computing device 1000 can include a processor 1002 that represents a microprocessor or controller for controlling the overall operation of computing device 1000. The computing device 1000 can also include a user input device 1008 that allows a user of the computing device 1000 to interact with the computing device 1000. For example, the user input device 1008 can take a variety of forms, such as a button, keypad, dial, touch screen, audio input interface, visual/image capture input interface, input in the form of sensor data, etc. Still further, the computing device 1000 can include a display 1010 (screen display) that can be controlled by the processor 1002 to display information to the user (for example, information relating to incoming, outgoing, or active communication session). A data bus 1016 can facilitate data transfer between at least a storage device 1040, the processor 1002, and a controller 1013. The controller 1013 can be used to interface with and control different equipment through an equipment control bus 1014. The computing device 1000 can also include a network/bus interface 1011 that couples to a data link 1012. In the case of a wireless connection, the network/bus interface 1011 can include wireless circuitry, such as a wireless transceiver and/or baseband processor.

The computing device 1000 also includes a storage device 1040, which can comprise a single storage or a plurality of storages (e.g., hard drives), and includes a storage management module that manages one or more partitions within the storage device 1040. In some embodiments, storage device 1040 can include flash memory, semiconductor (solid state) memory or the like. The computing device 1000 can also include a Random Access Memory ("RAM") 1020 and a Read-Only Memory ("ROM") 1022. The ROM 1022 can store programs, utilities or processes to be executed in a non-volatile manner. The RAM 1020 can provide volatile data storage, and stores instructions related to the operation of the computing device 1000. The computing device 1000 also houses or hosts a secure element 1050. In some embodiments, the secure element 1050 is an eUICC.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. An embedded universal integrated circuit card (eUICC) comprising:
    a memory; and
    one or more processors, wherein the memory includes instructions that, when executed by a processor of the one or more processors, cause the eUICC to perform operations comprising:
        receiving, via a device hosting the eUICC, a status code from an electronic subscriber identity module (eSIM) server, and
        when the status code indicates that a fresh one time public key (otPK) is to be used by the eUICC:
            generating a first otPK value,
            sending, via the device, the first otPK value to the eSIM server,
            receiving, from the eSIM server via the device, a first profile package comprising a first profile encrypted based on the first otPK value, and
            decrypting the first profile package based on a first session key, wherein the first session key is based on the first otPK value; and
        when the status code indicates that the eUICC is to recover from an error event using a particular otPK:
            determining a value of the particular otPK;
            receiving, from the eSIM server via the device, a second profile package comprising a second profile encrypted based on the particular otPK value; and
            decrypting the second profile package based on a second session key,
            wherein the second session key is based on the particular otPK value.

2. The eUICC of claim 1, wherein the determining the value of the particular otPK comprises:
    determining the value of particular otPK as a value of a most recent otPK generated by the eUICC.

3. The eUICC of claim 1, wherein the determining the value of the particular otPK comprises:
    receiving a first otPK hash value;
    comparing the first otPK hash value with a second otPK hash value; and
    when the first otPK hash value matches the second otPK hash value:
        determining a value of the particular otPK as a value of a second otPK, wherein the second otPK hash value comprises a hash of the value of the second otPK.

4. The eUICC of claim 1, wherein the determining the value of the particular otPK comprises:
    comparing an identification value of the eSIM server with an identification value of a second eSIM server; and
    when the identification value of the eSIM server matches the identification value of second the eSIM server:
        determining the value of the particular otPK as the value of a second otPK, wherein the second otPK value is associated by the eUICC with the identification value of the second eSIM server.

5. The eUICC of claim 1, wherein the operations further comprise:
    before receiving the status code from the eSIM server:
        obtaining an event identifier from a subscription manager discovery service (SMDS) server;
        performing a session handshake with the eSIM server, wherein the eSIM server is identified by the event identifier; and
        receiving a session token from the eSIM server.

6. The eUICC of claim 5, wherein the operations further comprise:
    after performing the session handshake and before receiving the status code:
        performing a second session handshake with the eSIM server; and
        sending the session token to the eSIM server.

7. The eUICC of claim 1, wherein the second profile is encrypted using a session key, S-ENC wherein the S-ENC is derived at the eSIM server based on the particular otPK.

8. The eUICC of claim 7, wherein the S-ENC comprises an elliptic curve cryptography key agreement (ECKA) session key.

9. A non-transitory computer readable medium storing instructions that when executed by a processor of a device, cause the device to perform operations comprising:
    receiving an activation code;
    sending a request for a profile to an eSIM server, wherein the request is based on the activation code;
    receiving a status code from the eSIM server; and
    when the status code indicates that a fresh one time public key (otPK) is to be used by an embedded universal integrated circuit card (eUICC) of the device:
        receiving, from the eSIM server, a first profile encrypted based on a first otPK; and
    when the status code indicates that the eUICC is to recover from an error event using a particular otPK:
        receiving, from the eSIM server, a second profile encrypted based on the particular otPK, wherein the particular otPK differs from the first otPK; and
        sending, to the eUICC, the second profile encrypted based on the particular otPK.

10. The non-transitory computer readable medium of claim 9, wherein the request comprises a hash value, wherein the hash value is a hash of the particular otPK.

11. The non-transitory computer readable medium of claim 9, further comprising:

when the status code indicates that the eUICC is to recover from the error event:
  receiving from the eSIM server a hash value, wherein the hash value is a hash of the particular otPK.

12. The non-transitory computer readable medium of claim 9, wherein the second profile is encrypted using a session key, S-ENC wherein the S-ENC is derived at the eSIM server based on the particular otPK.

13. The non-transitory computer readable medium of claim 12, wherein the S-ENC comprises an elliptic curve cryptography key agreement (ECKA) session key.

14. A method comprising:
  by an electronic subscriber identity module (eSIM) server:
    establishing a transport layer security (TLS) session with a device;
    authenticating with an embedded universal integrated circuit card (eUICC), wherein the eUICC is embedded in the device;
    receiving a profile request from the device, wherein the profile request comprises an event reference;
    determining whether the event reference is linked with a first profile associated with the eSIM server; and
    when the event reference is associated with the first profile:
      preparing a first status code, wherein the first status code indicates that the eUICC is to recover from an error event using a particular otPK, and
      sending the first status code to the device.

15. The method of claim 14, further comprising:
  when the event reference is associated with the first profile:
    downloading, to the eUICC via the device, the first profile encrypted based on the particular otPK.

16. The method of claim 14, wherein the event reference is an identifier of the eUICC.

17. The method of claim 14, further comprising:
  when the event reference is not linked with a profile associated with the eSIM server:
    preparing a second status code, wherein the second status code indicates that a fresh otPK is to be generated by the eUICC; and
    sending the second status code to the device.

18. The method of claim 17, further comprising:
  when the event reference is not linked with a profile associated with the eSIM server:
    receiving a second otPK value from the eUICC via the device; and
    downloading, to the eUICC via the device, a second profile encrypted based on the second otPK value.

19. The method of claim 14, wherein the event reference is an event identifier.

20. The method of claim 19, wherein the event reference is a hash value comprising a hash of an otPK value.

* * * * *